United States Patent
McWhirter et al.

(10) Patent No.: US 8,639,746 B2
(45) Date of Patent: *Jan. 28, 2014

(54) ARCHITECTURE, SYSTEM AND METHOD FOR MEDIATING COMMUNICATIONS BETWEEN A CLIENT COMPUTER SYSTEM AND A CLOUD COMPUTING SYSTEM WITH A DRIVER FRAMEWORK

(75) Inventors: Robert Kelley McWhirter, Wytheville, VA (US); Bryan Michael Kearney, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 194 days.

This patent is subject to a terminal disclaimer.

(21) Appl. No.: 12/828,795

(22) Filed: Jul. 1, 2010

(65) Prior Publication Data

US 2012/0005264 A1 Jan. 5, 2012

(51) Int. Cl.
*G06F 15/16* (2006.01)
(52) U.S. Cl.
USPC .......................... 709/203; 709/246; 719/328
(58) Field of Classification Search
USPC .................... 709/203, 246, 226; 719/328
See application file for complete search history.

(56) References Cited

U.S. PATENT DOCUMENTS

| | | | |
|---|---|---|---|
| 2006/0101474 A1 | 5/2006 | Magown | |
| 2007/0150596 A1 | 6/2007 | Miller et al. | |
| 2009/0216999 A1* | 8/2009 | Gebhart et al. | 712/36 |
| 2010/0050172 A1 | 2/2010 | Ferris et al. | |
| 2010/0050173 A1 | 2/2010 | Hensbergen | |
| 2010/0125669 A1* | 5/2010 | Esfahany et al. | 709/228 |
| 2010/0131649 A1 | 5/2010 | Ferris et al. | |
| 2010/0329642 A1 | 12/2010 | Kam et al. | |
| 2011/0069179 A1 | 3/2011 | Bathiche et al. | |
| 2011/0072487 A1 | 3/2011 | Hadar et al. | |
| 2011/0087726 A1* | 4/2011 | Shim et al. | 709/203 |
| 2011/0126197 A1 | 5/2011 | Larsen et al. | |
| 2012/0005262 A1 | 1/2012 | Mcwhirter | |
| 2012/0005263 A1 | 1/2012 | Mcwhirter | |
| 2012/0005341 A1 | 1/2012 | Seago | |
| 2012/0005359 A1 | 1/2012 | Seago | |
| 2012/0005584 A1 | 1/2012 | Seago | |

OTHER PUBLICATIONS

USPTO; Office Action for U.S. Appl. No. 12/828,778 mailed Mar. 29, 2012.
USPTO; Office Action for U.S. Appl. No. 12/828,787, mailed Mar. 29, 2012.
USPTO; Office Action for U.S. Appl. No. 12/828,817, mailed May 15, 2012.
USPTO; Office Action for U.S. Appl. No. 12/828,806, mailed Apr. 2, 2012.
USPTO; Office Action for U.S. Appl. No. 12/828,778 mailed Aug. 29, 2012.
USPTO; Office Action for U.S. Appl. No. 12/828,806, mailed Sep. 21, 2012.

(Continued)

*Primary Examiner* — El Hadji Sall
(74) *Attorney, Agent, or Firm* — Lowenstein Sandler LLP

(57) ABSTRACT

A method and apparatus for mediating communications between a client computer system and a cloud computing system with a driver framework is described. In one embodiment, the method includes receiving a request from a client computer system, wherein the request is in a neutral format and is directed to a cloud computing system. The method may also include translating the request from the neutral format to a second format supported by the cloud computing system utilizing a driver.

20 Claims, 6 Drawing Sheets

(56) References Cited

OTHER PUBLICATIONS

USPTO; Office Action for U.S. Appl. No. 12/828,778 mailed Nov. 6, 2012.
USPTO; Office Action for U.S. Appl. No. 12/828,787, mailed Sep. 12, 2012.
USPTO; Office Action for U.S. Appl. No. 12/828,817, mailed Jan. 19, 2012.
USPTO; Advisory Action for U.S. Appl. No. 12/828,817, mailed Feb. 1, 2013.
USPTO; Advisory Action for U.S. Appl. No. 12/828,806, mailed Dec. 4, 2012.
USPTO; Office Action for U.S. Appl. No. 12/828,809, mailed Aug. 3, 2012.

* cited by examiner

ARCHITECTURE, SYSTEM AND METHOD FOR MEDIATING COMMUNICATIONS BETWEEN A CLIENT COMPUTER SYSTEM AND A CLOUD COMPUTING SYSTEM WITH A DRIVER FRAMEWORK

RELATED APPLICATIONS

This application is related to the co-pending applications entitled ARCHITECTURE, SYSTEM AND METHOD FOR PROVIDING A NEUTRAL INTERFACE TO MULTIPLE CLOUD COMPUTING SYSTEMS concurrently filed on Jul. 1, 2010, U.S. patent application Ser. No. 12/828,787; and ARCHITECTURE, SYSTEM AND METHOD FOR PROVIDING A NEUTRAL APPLICATION PROGRAMMING INTERFACE FOR ACCESSING DIFFERENT CLOUD COMPUTING SYSTEMS concurrently filed on Jul. 1, 2010, U.S. patent application Ser. No. 12/828,778.

TECHNICAL FIELD

Embodiments of the invention relate to the field of cloud computing systems, and more particularly, to mediating communications between a client computer system and a cloud computing system with a driver framework.

BACKGROUND

Cloud computing is an architecture in which customers do not own the physical infrastructure related to an application, data storage center, etc. Instead, customers avoid the various expenses associated with operating computers, maintaining a communications network, maintaining software, etc. by purchasing usage from a third-party cloud system provider. Customers consume the resources of various third-party cloud systems over a communications network as a service.

Cloud systems, however, may be implemented in various formats, involve various communications protocols, and have various other specific requirements for interacting with the cloud systems. Thus, in order to interact with multiple cloud computing systems, consumer applications need to be tailored to each specific cloud system provider's requirements. As a result, a consumer will be less likely to switch cloud system providers when to make such a switch would require the consumer to update existing applications. Furthermore, the consumer may also be required to update their applications in response to cloud computing systems updates, such as when a formatting or communications protocol change occurs on a cloud system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus for mediating communications between a client computer system and a cloud computing system with a driver framework is described. In one embodiment, the method includes receiving a request from a client computer system, wherein the request is in a neutral format and is directed to a cloud computing system. The method may also include translating the request from the neutral format to a second format supported by the cloud computing system utilizing a driver.

Figure 1:
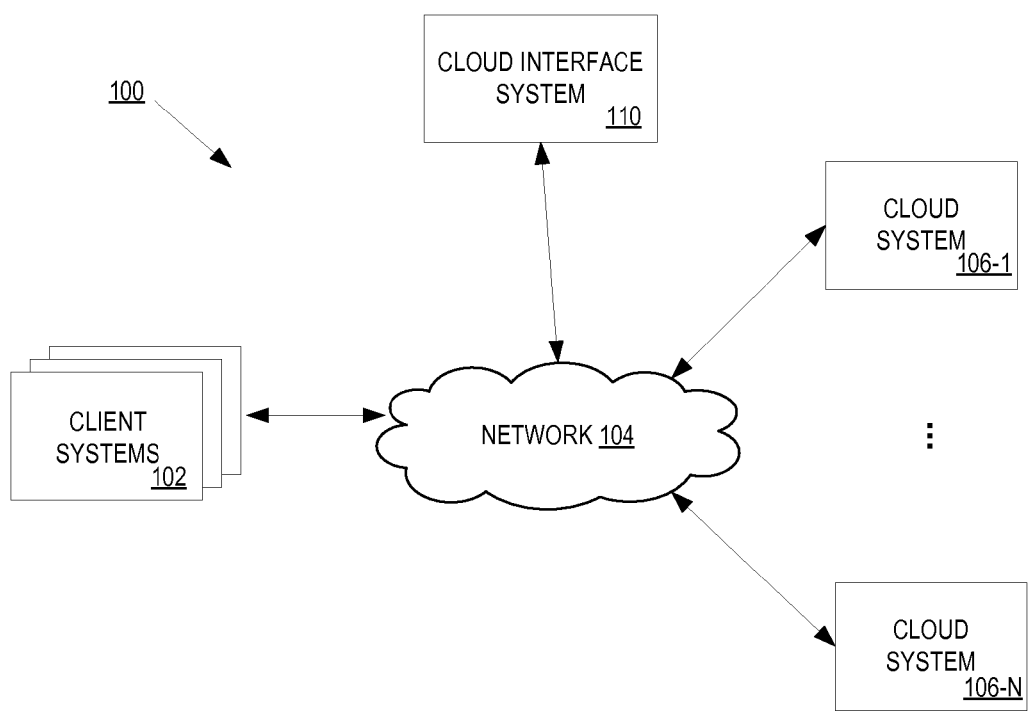
FIG. 1 is a block diagram of exemplary system architecture for a cloud computing interface system.

FIG. 1 is a block diagram of exemplary system architecture 100 for a cloud computing interface system. In one embodiment, the system architecture 100 includes client systems 102, cloud interface system 110, and cloud systems 1 through N, such as cloud systems 106. In one embodiment, the client systems 102, cloud interface system 110, and cloud systems 106 may include one or more computing devices such as server computers, desktop computers, laptop computer systems, netbooks, etc. Furthermore, the client systems 102, cloud interface system 110, and cloud systems 106 may be coupled to a computer network 104 that communicates via any of the standard protocols for the exchange of information.

In one embodiment, cloud interface system 110 is responsible for providing a neutral communications interface between client systems 102 and disparate cloud systems 106. In one embodiment, cloud systems 106 are server based systems that provide cloud computing services, such as remote data storage, business applications, internet services, security services, content distribution, etc. to client systems 102. However, different cloud providers, such as cloud system 106-1 and cloud system 106-N may communicate and provide their respective services via disparate interfaces or communications protocols. For example, the cloud systems 106 can be implemented using different computing platforms, such as AMAZON EC2™, RED HAT™ RHEV-M, VMWARE™ ESX, etc.

In one embodiment, cloud interface system 110 is an intermediary for communications between client systems 102 and cloud systems 106. In one embodiment, cloud interface system 110 abstracts vendor specific requirements, such as communication protocol, data formatting, etc., to a neutral cloud interface system 110 format. As discussed in greater detail below, in one embodiment, cloud interface system 110 translates client system 102 requests received in the neutral format to requests formatted for a specific target cloud system 106. In one embodiment, cloud interface system 110 further translates the responses of the cloud system 106 to the neutral format for client system 102.

In one embodiment, cloud-based applications executed by client systems 102 may access the services provided by disparate cloud systems 106 via a single vendor neutral communications syntax of cloud interface system 110. In one embodiment, client systems 102 are therefore insulated from vendor-specific communications protocols and messaging formats. As a result, if client system 102 switches between cloud systems 106-1 and 106-N, client system 102 needs only to direct their requests to a recipient cloud system 106-*i* via cloud interface system 110, without reformatting the request, issuing the request in a proprietary format, etc. In one embodiment, cloud interface system 110 translates the requests and responses thereby insulating client systems from difficulties that may arise from switching cloud system providers, updates to communications systems of cloud systems, protocol changes that apply to cloud systems, etc.

Figure 2:
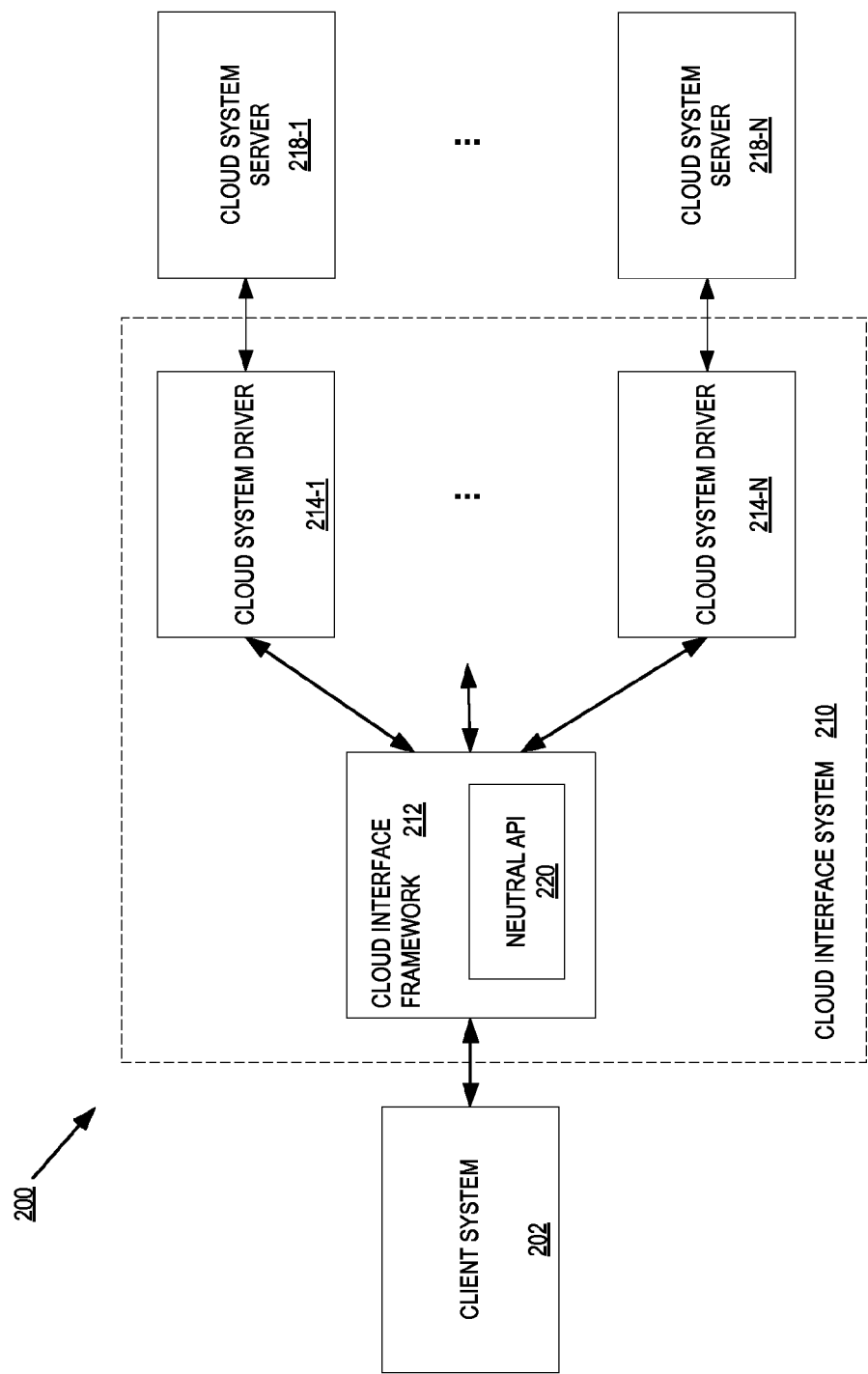
FIG. 2 is a block diagram of one embodiment of a cloud computing interface system.

FIG. 2 is a block diagram of one embodiment of a cloud computing interface system 200. In one embodiment, cloud computing interface system 200 provides additional details to the architecture discussed above with respect to FIG. 1.

In one embodiment, cloud interface system 210 is one or more server computer systems communicably coupled with client system 202 and one or more cloud systems 218. As will be discussed in greater detail below, cloud interface system 210 is an intermediary between client system 202 and cloud systems 218, and provides translation services to client systems 202. In one embodiment, cloud interface system 210 provides the translation services via cloud system specific drivers, such as cloud system drivers 214. Thus, in one embodiment, client system 202 issues requests to and receives responses from cloud interface system 210 in a neutral format, as discussed in greater detail below. Cloud interface system 210 translates the requests to and responses from the vendor-specific or proprietary cloud systems 218. Therefore, in one embodiment, client systems 202 are insulated from the specific details associated with each cloud system 218 provider.

In one embodiment, client system 202 connects to cloud interface system 210 via hypertext transfer protocol (HTTP). In one embodiment, client system 202 utilizes a representational state transfer (REST) communications protocol for communicating with cloud interface system 210. In one embodiment, the REST communications protocol is a communications protocol where client system 202 initiates requests in a neutral syntax to cloud interface system 210, and cloud interface system 210 processes the requests in order to return appropriate responses in the neutral syntax. In one embodiment, cloud interface system 210 translates the client system requests to a cloud system-specific request and then receives a cloud system-specific response. The cloud system-specific response is then translated into the neutral syntax and returned to the client system. In one embodiment, the neutral communications syntax is extensible markup language (XML) formatted communications.

In one embodiment, the neutral communications syntax may be a non-XML format, such as JSON, YAML, images, etc. In one embodiment, the syntax used for communication is denoted by the client through either URL manipulation or through using standard HTTP "Accept" headers. A server may or may not support a specific format. In one embodiment, the neutral abstract syntax may be realized as one or more concrete syntaxes (XML, JSON, YAML, etc) which may or may not be textual. For example, pictorial images may be utilized as a syntax.

In one embodiment, an abstract model of resources, such as images, instances, network interfaces, storage partitions, etc. Is defined. Through REST, this abstract model is converted into a concrete response using any suitable language (XML, JSON, YAML, etc.) or non-textual representation (JPEG images, etc).

In one embodiment, client system 202 communicates with cloud interface framework 212 via a neutral applications programming interface 220. In one embodiment, the neutral applications programming interface 220 implemented by cloud interface framework 212 defines the interface between client system 202 and cloud interface system 210. In one embodiment, the neutral applications programming interface 220 of cloud interface framework 212 defines images and instances. In one embodiment, an image is a prototype of a server computer system, which defines attributes of the server computer system, and acts as a template for creating instances on a server computer system. In one embodiment, an instance is a concrete server computer system that is realized from the image. In one embodiment, client system 202 creates instances to connect with various specific server cloud systems 218 via cloud interface system 210. In one embodiment, instances are created from images in order to allocate resources (i.e., virtual hardware) with a predefined configuration (i.e., an image). In other words, an instance can be seen as how services of a cloud system provider are "consumed."

In one embodiment, neutral applications programming interface 220 of cloud interface framework 212 further provides actions or methods that may be performed, via the instances, on cloud system 218 servers. For example, the actions may include start, stop, reboot, etc. that correspond to actions to be performed on a cloud system 218.

In one embodiment, the neutral applications programming interface 220 of cloud interface framework 212 provides an abstraction of the vendor specific implementations of cloud systems 218. In one embodiment, a cloud system driver 214 is responsible for translating and filtering communication between client system 202 and a corresponding cloud system 218. In one embodiment, cloud system drivers 214 translate the terms and actions, such as image, instance, start, reboot, etc., to cloud-specific terms and actions. For example, client system may refer to an image for a cloud system 218 via the neutral applications programming interface 220 of cloud interface framework 212. In one embodiment, a driver would translate the neutral formatted application programming interface image to the corresponding element supported by a cloud system 218, such as a template in RED HAT™ RHEV-M or a vendor specific image in AMAZON EC2™.

In one embodiment, cloud system drivers 214 enables bi-directional communication between the services offered by cloud system 218 and client system 202 without the need for client system 202 to change the programming of a client application or the formatting for communicating messages based on cloud system 202 requirements. Rather, cloud system drivers 214 provide the vendor-specific interface to cloud systems 218, while client system 202 communicates with cloud system drivers 214 via the neutral communication syntax, such as a standardized XML communications format, of the neutral applications programming interface 220 of the cloud interface framework 212.

In one embodiment, a cloud system driver is a plug-in application that plugs into cloud interface framework 212. In one embodiment, each cloud system driver is a single class that includes method calls. In one embodiment, a cloud system driver 214 receives client system 202 requests from the cloud interface framework 212. In one embodiment, a cloud system driver 214 translates the client system 202 request to a method call, which is executed on a corresponding cloud system 218. When the cloud system 218 responds, cloud system driver 214 translates the response into the neutral syntax and the response is provided to the client system 202.

In one embodiment, client system 202 connects to cloud systems 218 via a single instance connection with cloud interface framework 212. Thus, when client system 202 desires to connect to two cloud systems, such as cloud system 218-1 and 218-N, client system 202 creates two instances. Then, client system 202 requests to different cloud systems 218 would be directed to specific instances for the respective cloud systems.

In another embodiment, cloud interface framework 212 may multiplex communication between a single connection with client 202 and multiple cloud systems 218. Thus, client system 202 would set up a single connection with cloud interface system, and cloud interface framework would be responsible for routing client system 202 requests and responses between appropriate cloud system drivers 214.

Figure 3:
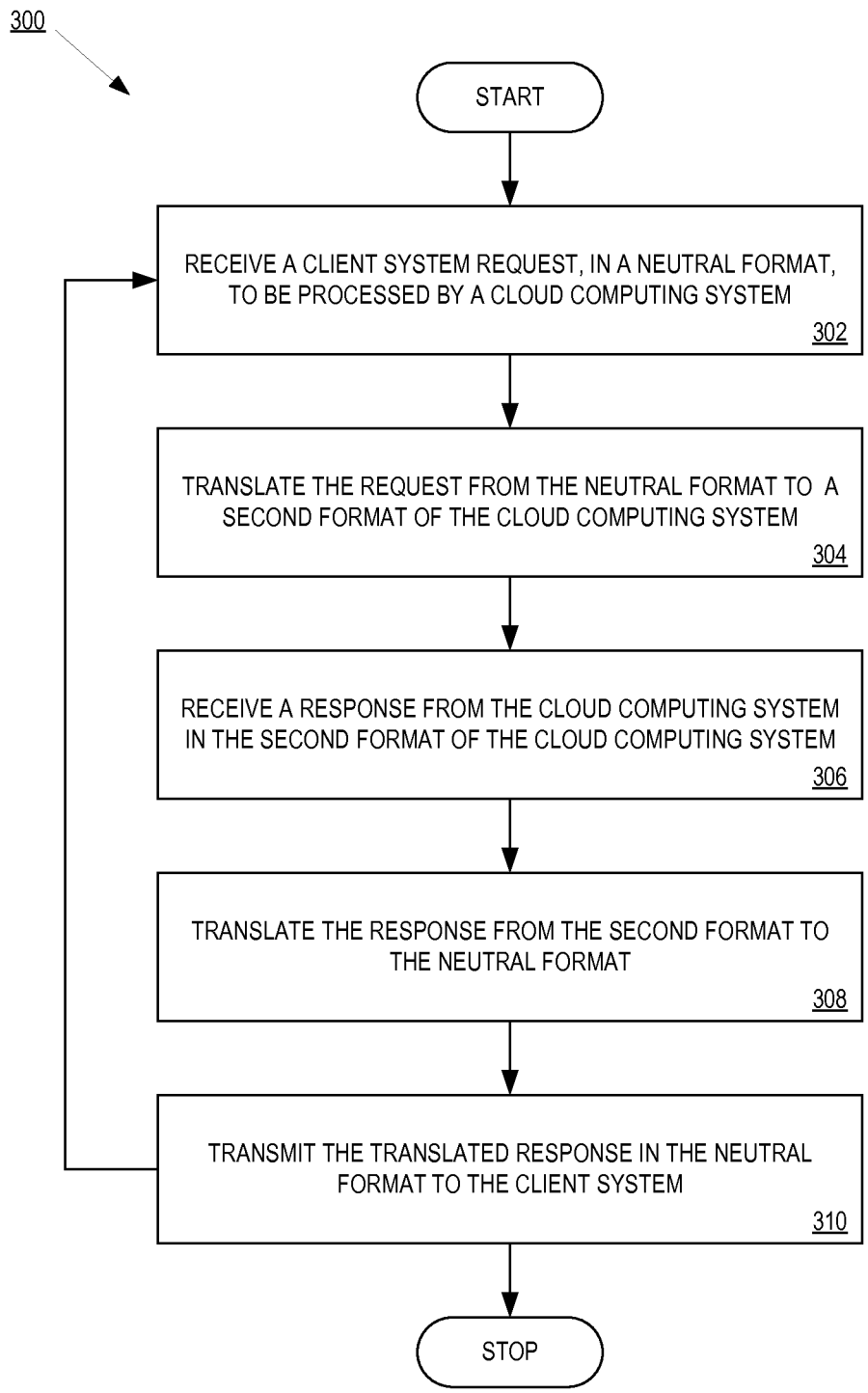
FIG. 3 is a flow diagram of one embodiment of a method for providing a cloud system interface as an intermediary for communication between a client computer system and a cloud computing system.

FIG. 3 is a flow diagram of one embodiment of a method 300 for providing a cloud system interface as an intermediary for communication between a client computer system and a cloud computing system. The method 300 is performed by processing logic that may comprise hardware (circuitry, dedicated logic, etc.), software (such as is run on a general purpose computer system or a dedicated machine), firmware, or a combination. In one embodiment, the method 300 is performed by cloud interface system 210 of FIG. 2.

Referring to FIG. 3, the process begins by receiving a client computer system request, in a neutral format, to be processed by a cloud computing system (processing block 302). In one embodiment, the request is a request for a service provided by a cloud computing system. Such requests depend on the services offered by the cloud computing systems subject to the request. For example, the request may be a storage request, security operation request, electronic business system request, etc. In one embodiment, the request is an HTTP request received by processing logic utilizing a REST communications protocol.

In one embodiment, a standard message formatting protocol may be utilized, such as extensible markup language (XML). Other protocols for formatting messages, such as hypertext markup language (HTML), standard generalized markup language (SGML), JavaScript Object Notation (JSON), YAML, etc. may also be utilized by processing logic. In another embodiment, processing logic may utilize a proprietary message formatting and communication scheme for receiving cloud computing system requests in the neutral format.

Processing logic translates the request from the neutral format to a second format of the cloud computing system (processing block 304). In one embodiment, the cloud computing system my be one of a number of different cloud computing system platforms which provide different interfaces, communicate using different message formatting, support different protocols, etc. For example, the cloud computing system may be one of AMAZON EC2™, RED HAT™ RHEV-M, VMWARE™ ESX, or any other cloud computing system. In one embodiment, the second format is a format supported by the cloud computing system.

Processing logic then receives a response from the cloud computing system in the second format of the cloud computing system (processing block 306). The response is then translated from the second format to the neutral format (processing block 308). In one embodiment, as discussed above, cloud computing system-specific drivers act as a translation service for mediating messages between a client computer system and a specific cloud computing system, without requiring the client computer system to implement a specific protocol of the cloud computing system, and vice-versa.

Processing logic then transmits the response in the neutral format to the client system (processing block 310). In one embodiment, the response is also transmitted via the HTTP connection utilizing the REST protocol.

In one embodiment, the translation to and from a neutral format to a proprietary or specific format supported by a cloud computing system simplifies application development for client computer systems. That is, the specifics of communicating with different cloud computing system is abstracted to a common communication protocol and format. The translation, performed by the processing logic discussed above, mediates the communication between the client computer system and the different cloud computer systems. Thus, the client computer system could change cloud computer systems, without changing client application code except for changing which cloud computer system to issue requests to. As a result, a client computer system could easily switch between cloud computing system providers without changing or upgrading a client computer system application.

Figure 4:
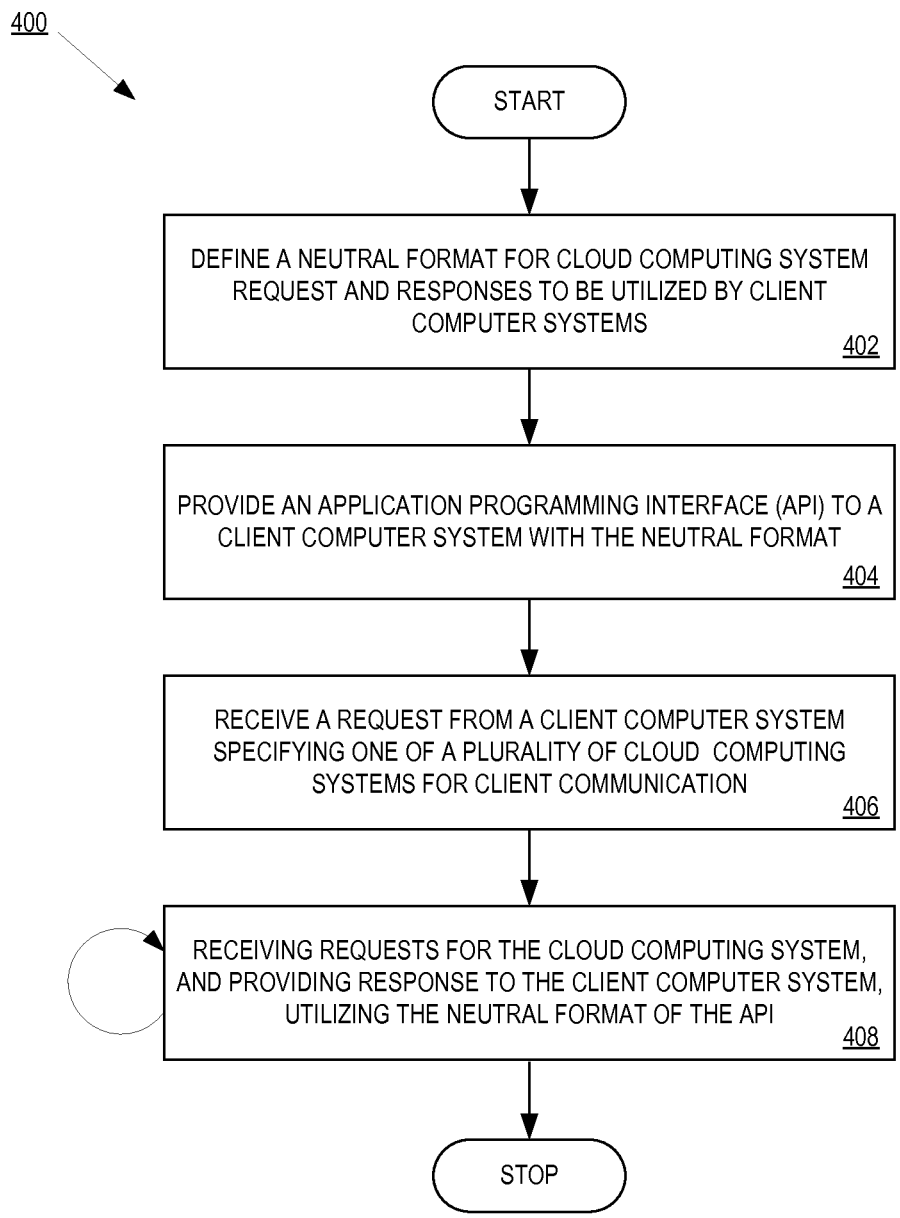
FIG. 4 is a flow diagram of one embodiment of a method for providing a neutral application programming interface for accessing different cloud computing systems.

FIG. 4 is a flow diagram of one embodiment of a method 400 for providing a neutral application programming interface for accessing different cloud computing systems. The method 400 is performed by processing logic that may comprise hardware (circuitry, dedicated logic, etc.), software (such as is run on a general purpose computer system or a dedicated machine), firmware, or a combination. In one embodiment, the method 400 is performed by cloud interface system 210 of FIG. 2.

Referring to FIG. 4, the process begins by defining a neutral format for cloud computing system requests and responses that is to be utilized by client computer systems (processing block 402). In one embodiment, the neutral format defines an application programming interface between a client computer system and a cloud interface system. In one embodiment, the application programming interface defines nouns and verbs that abstract typical cloud computing system parameters and functions, such as "images" and "instances." As discussed above, an image is a prototype of a server computer system, and defines attributes of the server computer system. Furthermore, an instance is a concrete server computer system that is realized from the image. Verbs abstract actions or methods that may be performed on different cloud computing system, such as start, stop, reboot, etc. In one embodiment as discussed above, a translator, such as a cloud system driver, is responsible for translating between the abstract nouns and verbs to cloud system specific commands.

Processing logic provides an application programming interface (API) to a client computer system with the neutral format (processing block 404). In one embodiment, the neutral format of the API exposes the translation services of a cloud interface system, such as cloud interface system 210 of FIG. 2, to software applications of client computer systems. Furthermore, the neutral format for communicating with a cloud interface system simplifies communication with disparate cloud computing systems, since the translation services of the cloud interface system handles conversion of messages for specific cloud computing system APIs, upgrades to an API of a cloud system, etc.

A request is then received from a client computer system specifying one of a plurality of cloud computer systems for client communication (processing block 406). In one embodiment, a client computer system specifies an entry point in the request. In one embodiment, the entry point may be a universal resource locator that resolves at a server computer system that provides a cloud interface system. In one embodiment, the entry point provides entry points to other collections for the neutral format, such as images and instances, discussed above, as well as flavors and realms, among other collections.

In one embodiment, a flavor represents a configuration of resources upon which a machine may be deployed. In one embodiment, a flavor defines aspects such as local disk storage, available RAM, architecture, number and speed of central processing units available, etc. In one embodiment, a realm represents a boundary containing resources, and a precise definition of a realm may be left to the cloud provider. In some cases, a realm may represent different data centers, different continents, or different pools of resources within a single data center.

Processing logic then receives client computer system requests for the cloud computing system, and provides responses to the client computer system, utilizing the neutral format of the API (processing block 408). In one embodiment, the requests and responses are handled by processing logic as discussed above in FIG. 3.

Figure 5:
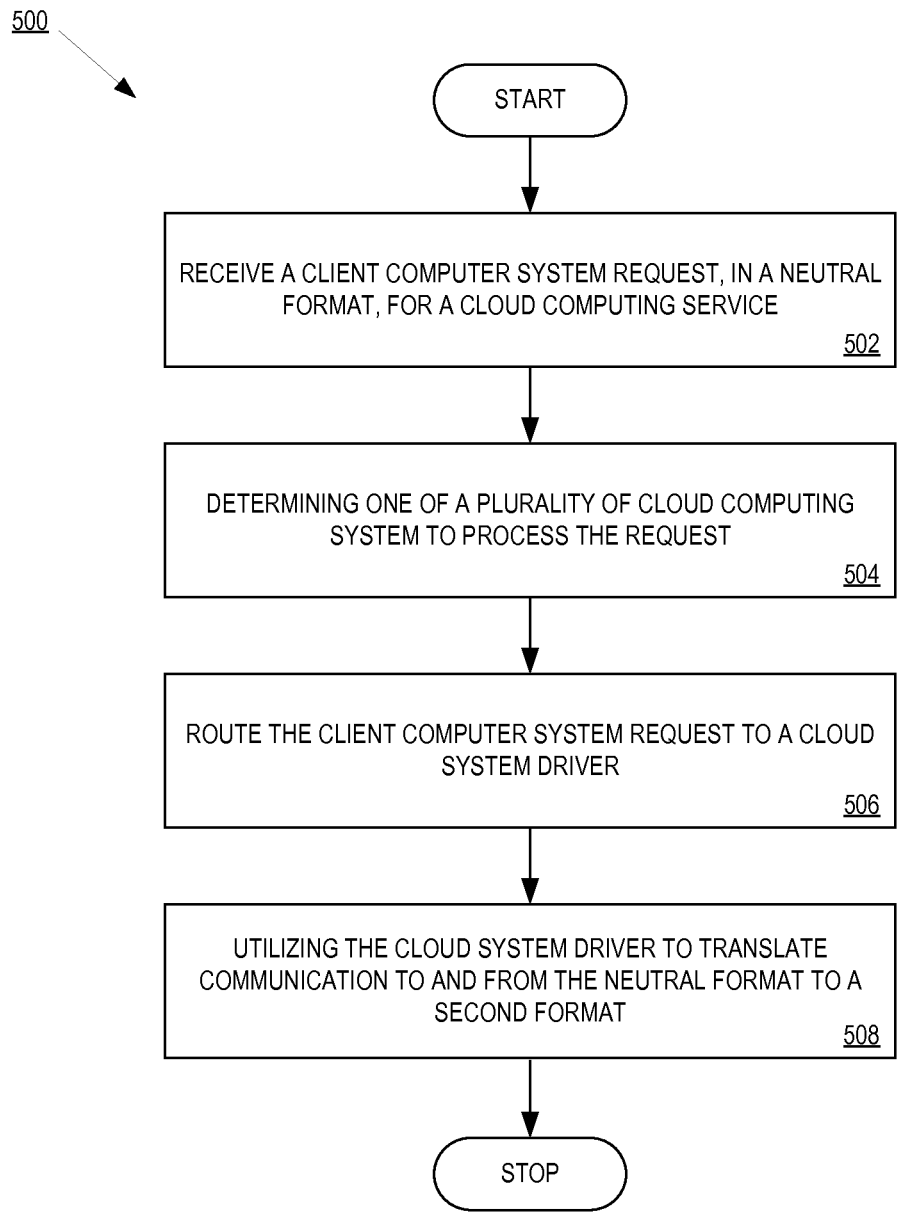
FIG. 5 is a flow diagram of one embodiment of a method for mediating communications between a client computer system and a cloud computing system with a driver framework.

FIG. 5 is a flow diagram of one embodiment of a method 500 for mediating communications between a client computer system and a cloud computing system with a driver framework. The method 500 is performed by processing logic that may comprise hardware (circuitry, dedicated logic, etc.), software (such as is run on a general purpose computer system or a dedicated machine), firmware, or a combination. In one embodiment, the method 500 is performed by cloud interface system 210 of FIG. 2.

Referring to FIG. 5, the process begins by receiving a client computer system request, in a neutral format, for a cloud computing service (processing block 502). Processing logic determines a cloud computing system, from among a plurality of cloud computing systems, to process the request (processing block 504). In one embodiment, a client computer system request may specify a destination cloud computing system for the request. For example, where a client computing system has access to an AMAZON EC2™-based cloud computing system and a RED HAT™ RHEV-M-based cloud computing system, a client request for a service may specify the request is to be directed to the RED HAT™ RHEV-M-based cloud computing system. In one embodiment, processing logic may determine the destination cloud computing system based on data within the request, or the request itself.

Processing logic then routes the client computer system request to a cloud system driver (processing block 506). Processing logic utilizes the cloud system driver to translate communication to and from the neutral format utilized by a client computer system and a second format of a cloud system driver (processing block 508). As discussed above, a cloud system driver is bi-directional communication converter. That is, a cloud system driver translates client computer system requests from a neutral format of an API of a cloud interface framework to a cloud computing system-specific message. For example, cloud system driver may translate a XML request to a JSON formatted request supported by a cloud computing system. As another example, cloud system driver may translate a single neutral command to N vendor-specific commands. In one embodiment, the message is a method call to be processed by the cloud computing system, and the response is return by a cloud computing system of the method call.

Figure 6:
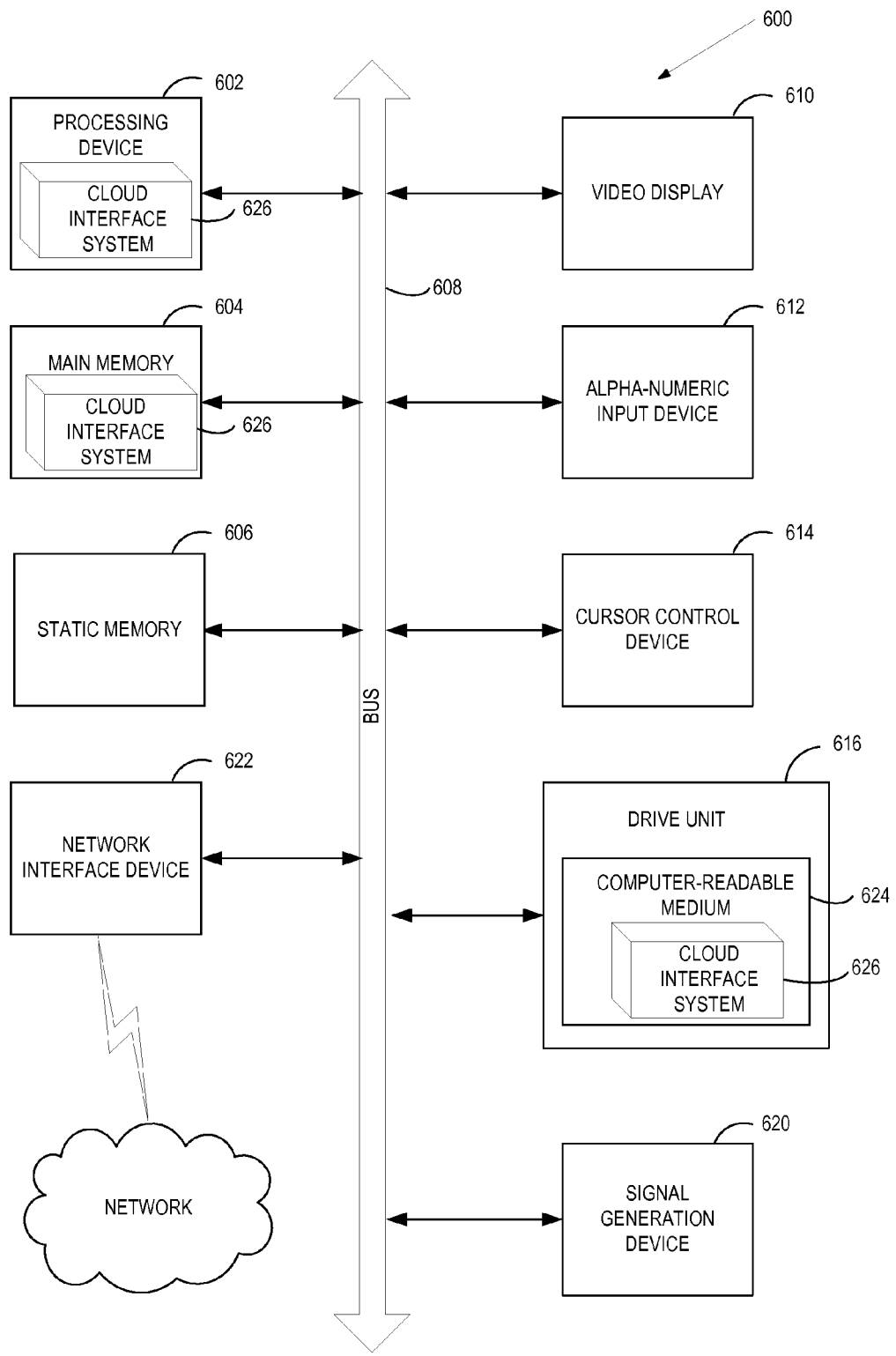
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 630 on which is stored one or more sets of instructions (e.g., the cloud interface system 626) embodying any one or more of the methodologies or functions described herein. The cloud interface system 626 may also reside, completely or at least partially, within the main memory 604 and/or within the processing device 602 during execution thereof by the computer system 600, the main memory 604 and the processing device 602 also constituting computer-readable storage media. The cloud interface system 626 may further be transmitted or received over a network 620 via the network interface device 608.

While the computer-readable storage medium 630 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "translating", "transmitting", "defining", "providing", "determining", "routing", "utilizing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A method comprising:
   receiving a first request from a client computer system to communicate with a first cloud computing system, wherein the first request is in a neutral syntax defining a neutral application interface between the client computer system and a cloud interface system;
   translating the first request from the neutral syntax to a second syntax supported by the first cloud computing system; and
   switching, by a processing device, the communication from the first cloud computing system to a second cloud computing system upon receipt of a second request from the client computer system, wherein the second request is in the neutral syntax and the switching comprises translating the second request from the neutral syntax to a third syntax supported by the second cloud computing system.

2. The method of claim 1, further comprising:
   transmitting the first request to the first cloud computing system in the second syntax.

3. The method of claim 1, further comprising:
   determining that the first cloud computing system is to process the first request; and
   routing the first request to a driver for translation, wherein the driver corresponds to the first cloud computing system.

4. The method of claim 3, wherein the first cloud computing system supports a messaging syntax.

5. The method of claim 1, wherein the neutral syntax is a syntax that is not supported by the first cloud computing system, and the second syntax is a communication formatted according to a specification of the first cloud computing system.

6. The method of claim 1, wherein the neutral syntax is extensible markup language.

7. The method of claim 1, wherein the first request is a request for a cloud computing service to be performed by the first cloud computing system.

8. A non-transitory computer readable storage medium that provides instructions, which when executed on a processing device causes the processing device to perform operations comprising:
   receiving a first request from a client computer system to communicate with a first cloud computing system, wherein the first request is in a neutral syntax defining a neutral application interface between the client computer system and a cloud interface system;
   translating the first request from the neutral syntax to a second syntax supported by the first cloud computing system; and
   switching, by the processing device, the communication from the first cloud computing system to a second cloud computing system upon receipt of a second request from the client computer system, wherein the second request is in the neutral syntax and the switching comprises translating the second request from the neutral syntax to a third syntax supported by the second cloud computing system.

9. The non-transitory computer readable storage medium of claim 8, the operations further comprising transmitting the first request to the first cloud computing system in the syntax.

10. The non-transitory computer readable storage medium of claim 8, the operations further comprising:
   determining that the first cloud computing system is to process the first request; and
   routing the first request to a driver for translation, wherein the driver corresponds to the first cloud computing system.

11. The non-transitory computer readable storage medium of claim 10, wherein the first cloud computing system supports a messaging syntax.

12. The non-transitory computer readable storage medium of claim 8, wherein the neutral syntax is a syntax that is not supported by the first cloud computing system, and the second syntax is a communication formatted according to a specification of the first cloud computing system.

13. The non-transitory computer readable storage medium of claim 8, wherein the neutral syntax is extensible markup language.

14. The non-transitory computer readable storage medium of claim 8, wherein the first request is a request for a cloud computing service to be performed by the first cloud computing system.

15. A system comprising:
   a memory; and
   a processing device coupled with the memory to:
      receive a first request from a client computer system to communicate with a first cloud computing system, wherein the first request is in a neutral syntax defining a neutral application interface between the client computer system and a cloud interface system,
      translate the first request from the neutral syntax to a second syntax supported by the first cloud computing system,
      switch the communication from the first cloud computing system to a second cloud computing system upon receipt of a second request from the client computer system, wherein the second request is in the neutral syntax and the switch comprises translate the second request from the neutral syntax to a third syntax supported by the second cloud computing system.

16. The system of claim 15,
   the processing device to transmit the first request to the first cloud computing system in the second format.

17. The system of claim 15,
   the processing device to determine that the first cloud computing system is to process the first request, and route the first request to a driver for translation, wherein the driver corresponds to the first cloud computing system.

18. The system of claim 17, wherein the first cloud computing systems supports a messaging syntax.

19. The system of claim 15, wherein the neutral syntax is a syntax that is not supported by the first cloud computing system, and the second syntax is a communication formatted according to a specification of the first cloud computing system.

20. The system of claim 15, wherein the neutral syntax is extensible markup language.

* * * * *